United States Patent
Morimura (10) Patent No.: US 11,131,381 B2
(45) Date of Patent: Sep. 28, 2021

(54) SHIFT DEVICE

(71) Applicant: KABUSHIKI KAISHA TOKAI-RIKA-DENKI-SEISAKUSHO, Aichi-ken (JP)

(72) Inventor: Kunihiro Morimura, Plymouth, MI (US)

(73) Assignee: KABUSHIKI KAISHA TOKAI-RIKA-DENKI-SEISAKUSHO, Aichi-Ken (JP)

(*) Notice: Subject to any disclaimer, the term of this patent is extended or adjusted under 35 U.S.C. 154(b) by 167 days.

(21) Appl. No.: 15/894,942

(22) Filed: Feb. 13, 2018

(65) Prior Publication Data

US 2019/0249772 A1   Aug. 15, 2019

(51) Int. Cl.
*F16H 61/24* (2006.01)
*F16H 59/08* (2006.01)

(52) U.S. Cl.
CPC ............. *F16H 61/24* (2013.01); *F16H 59/08* (2013.01); *F16H 2059/081* (2013.01); *F16H 2061/242* (2013.01); *F16H 2061/243* (2013.01); *F16H 2061/247* (2013.01)

(58) Field of Classification Search
CPC ........... F16H 59/0278; F16H 2059/081; F16H 2061/242; F16H 2061/243; F16H 2061/247; F16H 61/24; F16H 59/0204; F16H 61/22; G05G 1/10
USPC ................. 74/473.24, 473.25, 473.27, 473.3
See application file for complete search history.

(56) References Cited

U.S. PATENT DOCUMENTS

| | | | |
|---|---|---|---|
| 2002/0080114 A1* | 6/2002 | Numata | G05G 1/10 345/156 |
| 2003/0029261 A1* | 2/2003 | DeJonge | B60K 37/06 74/335 |
| 2008/0115613 A1 | 5/2008 | Giefer et al. | |
| 2008/0185272 A1* | 8/2008 | Otani | B60K 37/06 200/318 |
| 2012/0085193 A1* | 4/2012 | Heo | F16H 59/04 74/473.18 |
| 2014/0345409 A1* | 11/2014 | Watanabe | F16H 59/08 74/473.3 |
| 2016/0215875 A1* | 7/2016 | Grennvall | F16H 61/24 |
| 2016/0245396 A1 | 8/2016 | Behounek et al. | |

FOREIGN PATENT DOCUMENTS

| | | | | |
|---|---|---|---|---|
| DE | 102017210443 A1 * | 12/2018 | | B60K 37/06 |
| WO | WO-2018101907 A1 * | 6/2018 | | F16H 59/08 |

* cited by examiner

*Primary Examiner* — Joseph Brown
(74) *Attorney, Agent, or Firm* — Solaris Intellectual Property Group, PLLC (57) ABSTRACT

In a shift device, a changing mechanism displaces a carrier to thereby change a rotation stratum in which the carrier is disposed and change rotation paths with which detent pins of the carrier are engaged. For this reason, to change the rotation paths with which the detent pins are engaged, the changing mechanism needs only to displace the carrier, and so the configuration of the changing mechanism can be simplified.

5 Claims, 8 Drawing Sheets

SHIFT DEVICE

BACKGROUND

Technical Field

The present invention relates to a shift device where the shift position of a shift member is changed as a result of the shift member being moved.

Related Art

US 2008/0115613 A1 discloses an actuating device where a crank disk is integrally rotatably connected to a rotary switch and where plural crank segments are provided in the crank disk. Moreover, stop bolt is relatively rotatable with respect to the crank segment in a state in which the stop bolt is disposed in the crank segment, and the rotatable range of the rotary switch is defined.

Here, in this actuating device, the stop bolt is provided in correspondence to each crank segment, and the plural stop bolts are driven to change the crank segment in which the stop bolt is disposed.

SUMMARY

In view of the circumstance described above, it is an object of the present invention to obtain a shift device with which the configuration of a changing mechanism can be simplified.

A shift device of a first aspect of the invention includes: a shift member whose shift position is changed as a result of being moved with respect to a vehicle body side; plural movement paths provided at one of the vehicle body side or a shift member side; a moving portion that is provided at the other of the vehicle body side or the shift member side, that is relatively movable with respect to the movement path in a state in which the moving portion is disposed in the movement path, and by which a movable range of the shift member is defined; and a changing mechanism that relatively displaces the moving portion with respect to the one of the vehicle body side or the shift member side to thereby change the movement path in which the moving portion is disposed.

In the shift device of the first aspect of the invention, the shift position of the shift member is changed as a result of the shift member being moved. Furthermore, the plural movement paths are provided at one of the vehicle body side or the shift member side, the moving portion is provided at the other of the vehicle body side or the shift member side, the moving portion is relatively movable with respect to the movement path in a state in which the moving portion is disposed in the movement path, and the movable range of the shift member is defined.

Here, the changing mechanism relatively displaces the moving portion with respect to the one of the vehicle body side or the shift member side to thereby change the movement path in which the moving portion is disposed. For this reason, to change the movement path in which the moving portion is disposed, the changing mechanism needs only to relatively displace the moving portion with respect to the one of the vehicle body side or the shift member side, and so the configuration of the changing mechanism can be simplified.

A shift device of a second aspect of the invention is the shift device of the first aspect of the invention, wherein the movable range of the shift member is changed as a result of the movement path in which the moving portion is disposed being changed.

In the shift device of the second aspect of the invention, the movable range of the shift member is changed as a result of the movement path in which the moving portion is disposed being changed. For this reason, the movable range of the shift member can be changed.

A shift device of a third aspect of the invention is the shift device of the first aspect of the invention, wherein the plural movement paths are lined up in a direction perpendicular to movement of the shift member.

In the shift device of the third aspect of the invention, the plural movement paths are lined up in the direction perpendicular to the movement of the shift member. For this reason, the changing mechanism can change the movement path in which the moving portion is disposed by relatively displacing, in the direction perpendicular to the movement of the shift member, the moving portion with respect to the one of the vehicle body side or the shift member side.

A shift device of a fourth aspect of the invention is the shift device of the first aspect of the invention, wherein the shift member is biased toward its shift position as a result of the moving portion being disposed in the movement path.

In the shift device of the fourth aspect of the invention, the shift member is biased toward its shift position as a result of the moving portion being disposed in the movement path. For this reason, the moving portion can be used to bias the shift member toward its shift position.

A shift device of a fifth aspect of the invention is the shift device of the first aspect of the invention, further including a regulation portion that is provided at the one of the vehicle body side or the shift member side and by which movement of the shift member is regulated as a result of the moving portion being disposed in the regulation portion.

In the shift device of the fifth aspect of the invention, the movement of the shift member is regulated as a result of the moving portion being disposed in the regulation portion provided at the one of the vehicle body side or the shift member side. For this reason, the moving portion can be used to regulate the movement of the shift member.

BRIEF DESCRIPTION OF THE DRAWINGS

An exemplary embodiment of the present invention will be described in detail based on the following figures, wherein.

and

DETAILED DESCRIPTION

Figure 1:
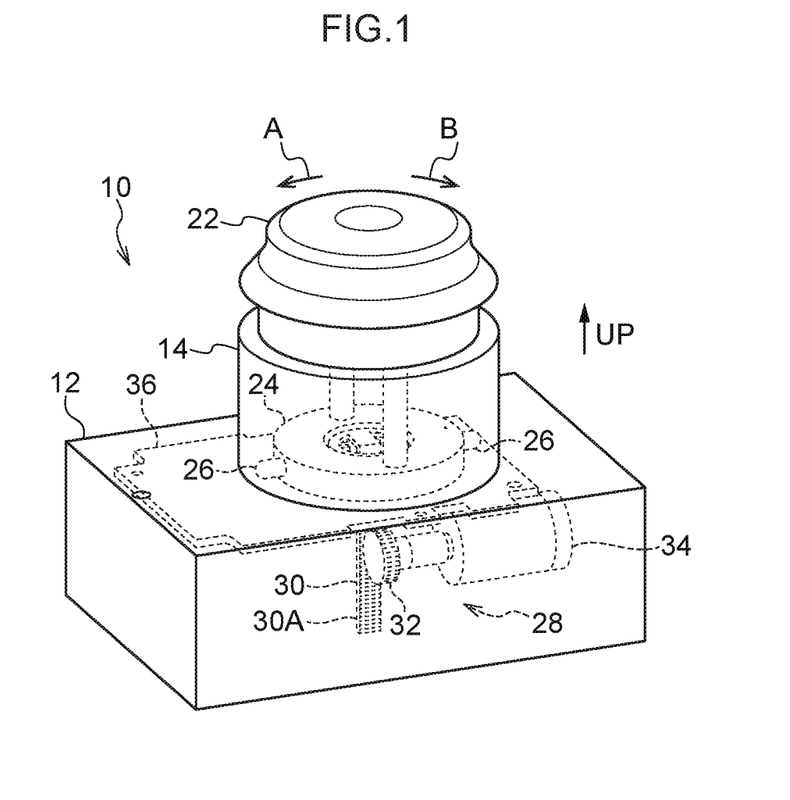
FIG. 1 is a perspective view, seen from above, showing a shift device pertaining to the embodiment of the invention.
Figure 2:
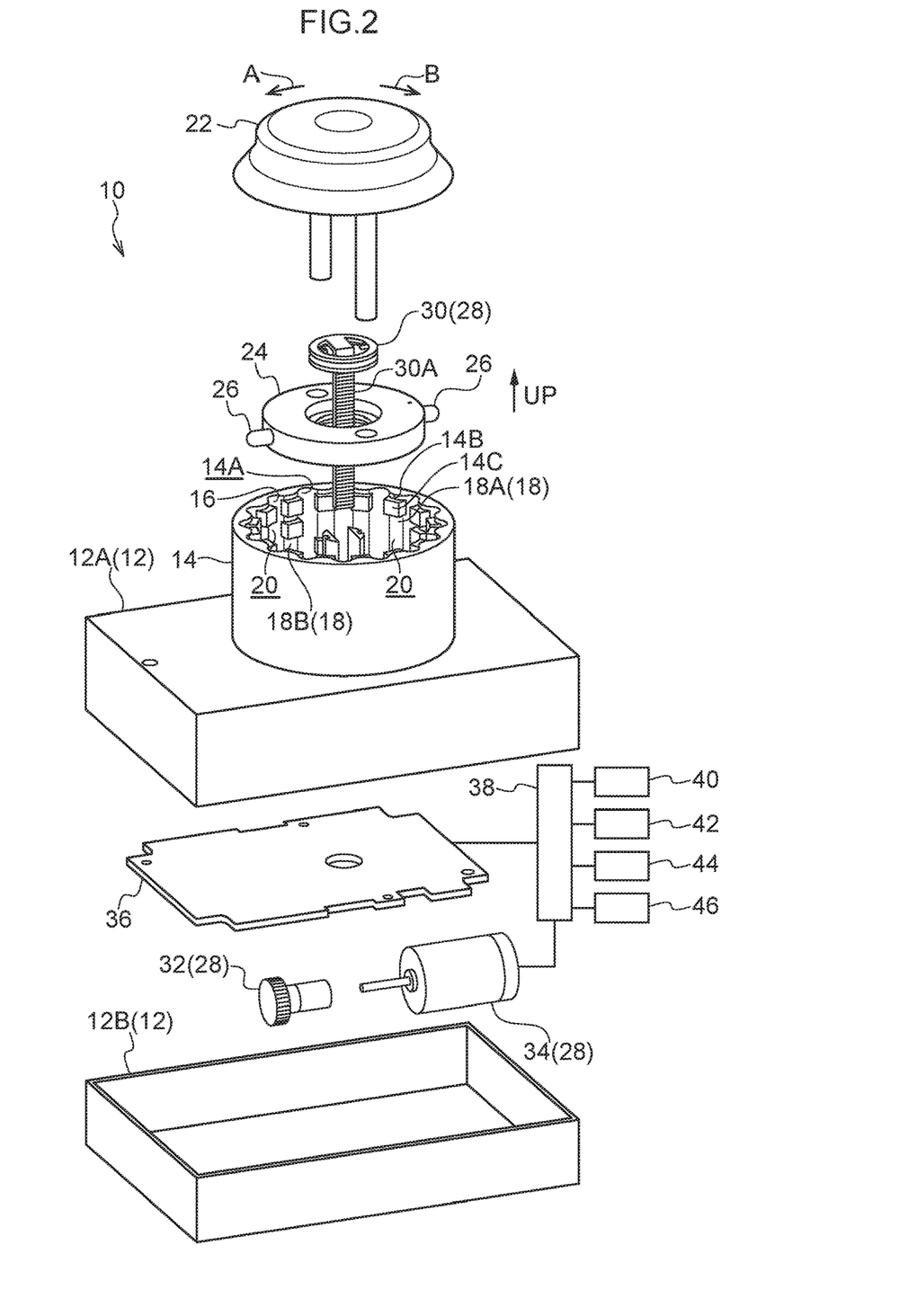
FIG. 2 is an exploded perspective view, seen from above, showing the shift device pertaining to the embodiment of the invention.

FIG. 1 is a perspective view showing a shift device 10 pertaining to an embodiment of the invention as seen from above. FIG. 2 is an exploded perspective view showing the shift device 10 as seen from above. It will be noted that, in the drawings, arrow UP indicates an upward direction of the shift device 10.

The shift device 10 pertaining to the present embodiment is installed in a console (not shown in the drawings) of a vehicle (automobile) and is disposed on the vehicle front side and the vehicle width direction inner side of a driver's seat (not shown in the drawings) of the vehicle. The upward direction of the shift device 10 faces the upward direction of the vehicle.

As shown in FIG. 1 and FIG. 2, the shift device 10 is provided with a substantially cuboidal box-shaped case 12 serving as a vehicle body side and as a support member. The case 12 is installed inside the console. A case upper member 12A is provided on the upper side of the case 12, and a case lower member 12B is provided on the lower side of the case 12. The case 12 is configured by putting together the case upper member 12A and the case lower member 12B.

A substantially cylindrical engagement tube 14 serving as an engagement portion is integrally provided on the upper side of the case 12 (the case upper member 12A). The axial direction of the engagement tube 14 is disposed parallel to the up and down direction. Plural (sixteen in the present embodiment) substantially semi-cylindrical recess portions 14A are formed in the inner peripheral surface of the engagement tube 14. The plural recess portions 14A extend in the up and down direction and are disposed at regular intervals in the circumferential direction of the engagement tube 14. Substantially semi-cylindrical ridge portions 14B are formed between the recess portions 14A in the inner peripheral surface of the engagement tube 14. The plural ridge portions 14B extend in the up and down direction and are disposed at regular intervals in the circumferential direction of the engagement tube 14.

A regulation stratum 16 (see FIG. 3A) serving as a regulation portion is formed in the upper end portion of the inner peripheral surface of the engagement tube 14. The regulation stratum 16 is disposed along the entire circumference of the engagement tube 14. Substantially cuboid regulation projections 14C are integrally provided on the ridge portions 14B of the regulation stratum 16. The regulation projections 14C project inward in the radial direction of the engagement tube 14.

Figure 3A:
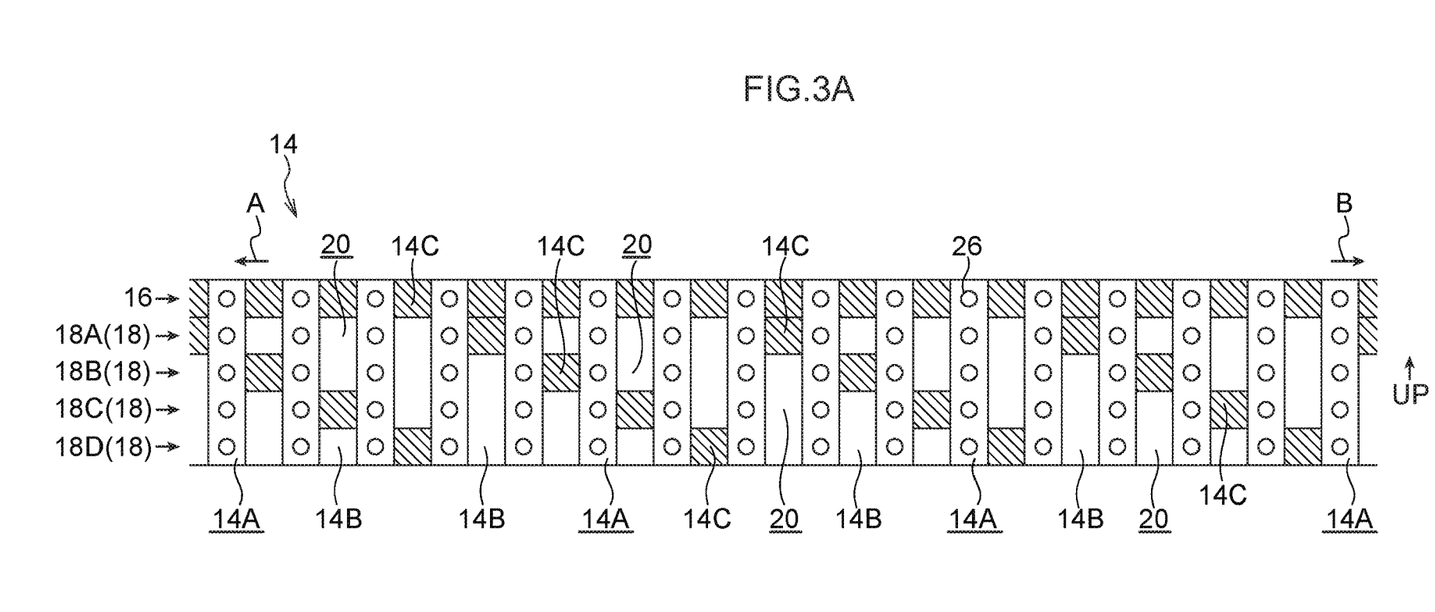
FIG. 3A is developed view showing positions where detent pins engage with an inner peripheral surface of an engagement tube when a knob is disposed in shift positions in the shift device pertaining to the embodiment of the invention.

Plural (four in the present embodiment) rotation strata 18 serving as movement strata are formed on the lower side of the regulation stratum 16 in the inner peripheral surface of the engagement tube 14 (see FIG. 3A). The rotation strata 18 are disposed along the entire circumference of the engagement tube 14 and include a first stratum 18A, a second stratum 18B, a third stratum 18C, and a fourth stratum 18D heading from the upper side to the lower side.

Figure 3B:
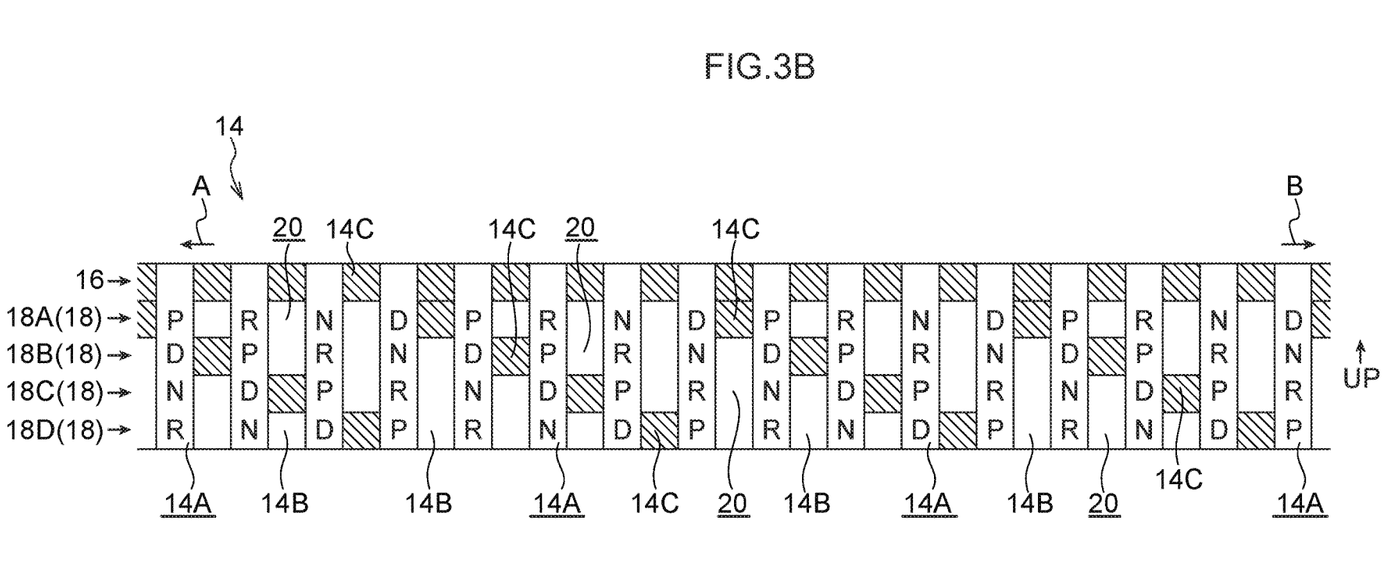
FIG. 3B is a developed view showing the arrangement of P recesses, R recesses, N recesses, and D recesses in the inner peripheral surface of the engagement tube in the shift device pertaining to the embodiment of the invention.

Plural (four in the present embodiment) regulation projections 14C that are the same as those described above are provided in each of the rotation strata 18. The regulation projections 14C are disposed every plurality (four in the present embodiment) of ridge portions 14B and are disposed on opposite sides of each other across the central axis of the engagement tube 14. Rotation paths 20 serving as movement paths are provided between the regulation projections 14C in each of the rotation strata 18, and plural (four in the present embodiment) recess portions 14A are disposed in each of the rotation paths 20. The recess portions 14A in each of the rotation paths 20 include a P recess, an R recess, an N recess, and a D recess (see FIG. 3B) heading from one direction side (the direction of arrow A in FIG. 1, etc.) to the other direction side (the direction of arrow B in FIG. 1, etc.).

The regulation projections 14C of the second stratum 18B are disposed one ridge portion 14B on the other direction side of the regulation projections 14C of the first stratum 18A, and the rotation paths 20 of the second stratum 18B are disposed one recess portion 14A on the other direction side of the rotation paths 20 of the first stratum 18A. The regulation projections 14C of the third stratum 18C are disposed one ridge portion 14B on the other direction side of the regulation projections 14C of the second stratum 18B, and the rotation paths 20 of the third stratum 18C are disposed one recess portion 14A on the other direction side of the rotation paths 20 of the second stratum 18B. The regulation projections 14C of the fourth stratum 18D are disposed one ridge portion 14B on the other direction side of the regulation projections 14C of the third stratum 18C (one ridge portion 14B on the one direction side of the regulation projections 14C of the first stratum 18A), and the rotation paths 20 of the fourth stratum 18D are disposed one recess portion 14A on the other direction side of the rotation paths 20 of the third stratum 18C (one recess portion 14A on the one direction side of the rotation paths 20 of the first stratum 18A). For this reason, P recesses, R recesses, N recesses, and D recesses are provided in the first stratum 18A, the second stratum 18B, the third stratum 18C, and the fourth stratum 18D in each of the recess portions 14A.

A substantially bottomed cylindrical knob 22 serving as a shift member (operation member) is supported on the upper side of the engagement tube 14, and the inside of the knob 22 is downwardly open. The knob 22 is disposed coaxially with the engagement tube 14 and is rotatable (movable) about its axis. The knob 22 projects inside the cabin from the console and can be rotatingly operated in the one direction and the other direction by an occupant of the vehicle. By rotating the knob 22 from the one direction side to the other direction side, the knob 22 can be disposed, in the following order, in a "P" position (park position, first shift position), an "R" position (reverse position), an "N" position (neutral position, second shift position), and a "D" position (drive position) serving as shift positions.

A disc-shaped carrier 24 serving as a displacement member is coaxially provided inside the engagement tube 14. The carrier 24 is rotatable (movable) about its axis and displaceable in the up and down direction. The knob 22 is connected to the carrier 24, and the carrier 24 is integrally rotatable with the knob 22 and displaceable in the up and down direction with respect to the knob 22. Furthermore, the carrier 24 can, as a result of being displaced in the up and down direction, be disposed in the regulation stratum 16 and the rotation strata 18 (the first stratum 18A to the fourth stratum 18D) (disposed in up and down direction positions in the regulation stratum 16 and the rotation strata 18) of the inner peripheral surface of the engagement tube 14.

A pair of substantially cylindrical detent pins 26 serving as moving portions are provided on the carrier 24. The pair of detent pins 26 are disposed on opposite sides of each other across the central axis of the carrier 24. The axial direction of the detent pins 26 is disposed parallel to the radial direction of the carrier 24. Distal end surfaces of the detent pins 26 (the surfaces on the outer sides in the radial direction of the carrier 24) are convexly curved. The detent pins 26 are movable in the radial direction of the carrier 24 and are rotatable and displaceable in the up and down direction integrally with the carrier 24. The detent pins 26 are biased outward in the radial direction of the carrier 24 and, at their distal end surfaces, are engaged (brought into abutting contact) with the inner peripheral surface of the engagement tube 14 of the case 12 because of biasing force. The regulation projections 14C inside the engagement tube 14 can interfere with the detent pins 26. When the regulation projections 14C interfere with the detent pins 26 so that rotation of the detent pins 26 is regulated, rotation of the carrier 24 is regulated and rotation of the knob 22 is regulated.

The carrier 24 is disposed in the rotation stratum 18 (any one of the first stratum 18A to the fourth stratum 18D) of the inner peripheral surface of the engagement tube 14, the detent pins 26 are rotatable in the rotation paths 20 of the rotation strata 18 (between the regulation projections 14C), the detent pins 26 are engaged with the P recesses, the R recesses, the N recesses, and the D recesses that are the recess portions 14A of the rotation paths 20 because of biasing force, and the knob 22 is disposed in the "P" position, the "R" position, the "N" position, and the "D" position. When the knob 22 is disposed between shift positions, biasing force from the ridge portion 14B sides to the recess portion 14A sides of the rotation paths 20 acts on the carrier 24 because of the biasing force on the detent pins 26, and biasing force from between the shift positions toward the shift positions acts on the knob 22. When the carrier 24 is disposed in the regulation stratum 16 of the inner peripheral surface of the engagement tube 14, rotation of the detent pins 26 in the one direction and the other direction from the recess portions 14A is regulated by the regulation projections 14C and rotation of the carrier 24 and the knob 22 in the one direction and the other direction is regulated.

A changing mechanism 28 is connected to the carrier 24.

The changing mechanism 28 is provided with a substantially bar-shaped lifter 30 serving as a changing member. The lifter 30 is coaxially disposed inside the engagement tube 14, and rotation of the lifter 30 about the axis of the engagement tube 14 and movement of the lifter 30 in the radial direction of the engagement tube 14 are regulated. The upper end portion of the lifter 30 is connected to the inner peripheral portion of the carrier 24. The lifter 30 is displaceable in the up and down direction integrally with the carrier 24 and allows rotation of the carrier 24 in a state in which movement in the radial direction of the carrier 24 is regulated. A rack 30A is coaxially provided on the section of the lifter 30 excluding the upper end portion, and the rack 30A is inserted into the case 12 in such a way that the rack 30A is displaceable in the up and down direction.

A lifter gear 32 is meshed with the rack 30A. The lifter gear 32 is supported on, in such a way as to be coaxial and integrally rotatable with, an output shaft of a motor 34 serving as a drive device. The motor 34 is secured inside the case 12. Rotation of the lifter gear 32 and displacement of the lifter 30 in the up and down direction are regulated, and when the motor 34 is driven so that the output shaft of the motor 34 is rotated, the lifter gear 32 is rotated so that the lifter 30 and the carrier 24 (including the detent pins 26) become displaced in the up and down direction.

A substrate 36 serving as a detection device is secured inside the case 12. The substrate 36 is disposed perpendicular to the up and down direction between the engagement tube 14 and the lifter gear 32, and the rack 30A of the lifter 30 runs through the substrate 36 in such a way that the rack 30A is displaceable in the up and down direction. The substrate 36 can detect the displaced position of the carrier 24 in the up and down direction by detecting the displaced position of the lifter 30 in the up and down direction (the substrate 36 may also directly detect the displaced position of the carrier 24 in the up and down direction). Because of this, the disposition of the carrier 24 on the regulation stratum 16 and the rotation strata 18 (the first stratum 18A to the fourth stratum 18D) of the inner peripheral surface of the engagement tube 14 is detected. Moreover, the substrate 36 detect the rotational position of the knob 22 by detecting the rotational position of the carrier 24 (the substrate 36 may also directly detect the rotational position of the knob 22). Because of this, the engagement of the detent pins 26 with the P recesses, the R recesses, the N recesses, and the D recesses that are the recess portions 14A of the rotation paths 20 of the rotation strata 18 is detected, and the disposition of the knob 22 in the "P" position, the "R" position, the "N" position, and the "D" position is detected.

The substrate 36 is electrically connected to a control device 38 of the vehicle. The motor 34 of the changing mechanism 28 and an engine 40 of the vehicle are electrically connected to the control device 38. An automatic transmission 42 serving as a transmission of the vehicle is electrically connected to the control device 38. When the knob 22 has been disposed in the "P" position, the "R" position, the "N" position, and the "D" position (when the substrate 36 has detected the disposition of the knob 22 in the "P" position, the "R" position, the "N" position, and the "D" position), the shift range of the automatic transmission 42 is changed, by the control of the control device 38, to a "P" range (park range), an "R" range (reverse range), an "N" range (neutral range), and a "D" range (drive range) corresponding to the shift position of the knob 22. A brake 44 serving as an operation member is electrically connected to the control device 38. When the brake 44 is operated by the occupant, the vehicle is braked. A switch 46 serving as an operation member is electrically connected to the control device 38. The switch 46 can be operated for regulation and operated for cancellation by the occupant.

Next, the action of the present embodiment will be described.

In the shift device 10 having the above configuration, the carrier 24 is disposed in the rotation stratum 18 (any one of the first stratum 18A to the fourth stratum 18D) of the inner peripheral surface of the engagement tube 14 of the case 12, the detent pins 26 of the carrier 24 are engaged with the rotation paths 20 of the rotation stratum 18 because of biasing force, the detent pins 26 are rotatable in the rotation paths 20 (between the regulation projections 14C inside the engagement tube 14), and the rotatable range of the carrier 24 and the knob 22 is defined.

Figure 5A:
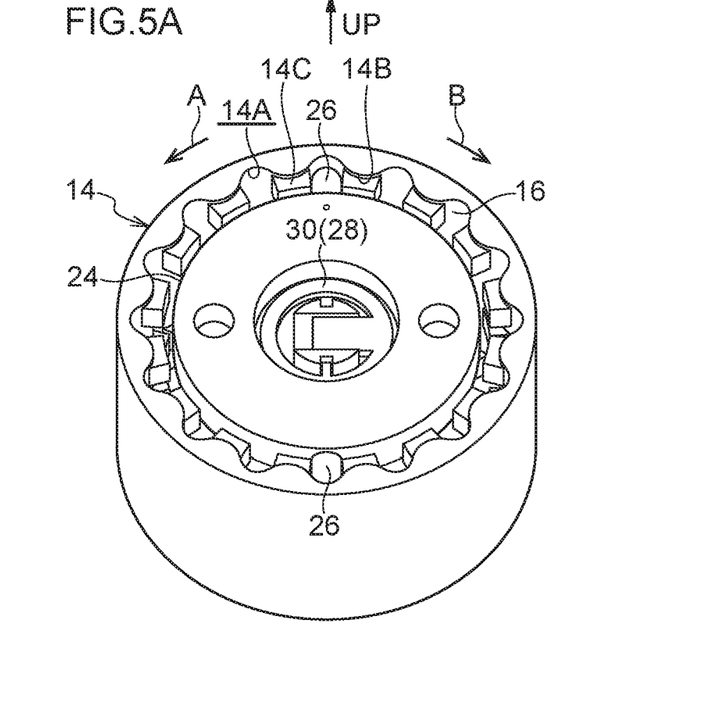
FIG. 5A is a perspective view showing when rotation of the knob from the "P" position is regulated in the shift device pertaining to the embodiment of the invention.
Figure 5B:
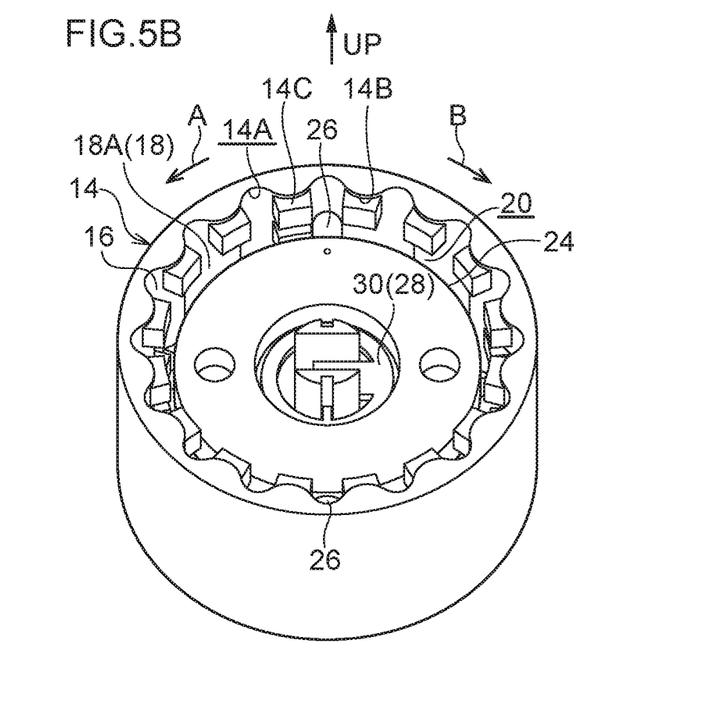
FIG. 5B is a perspective view showing when rotation of the knob from the "P" position is allowed in the shift device pertaining to the embodiment of the invention.
Figure 6A:
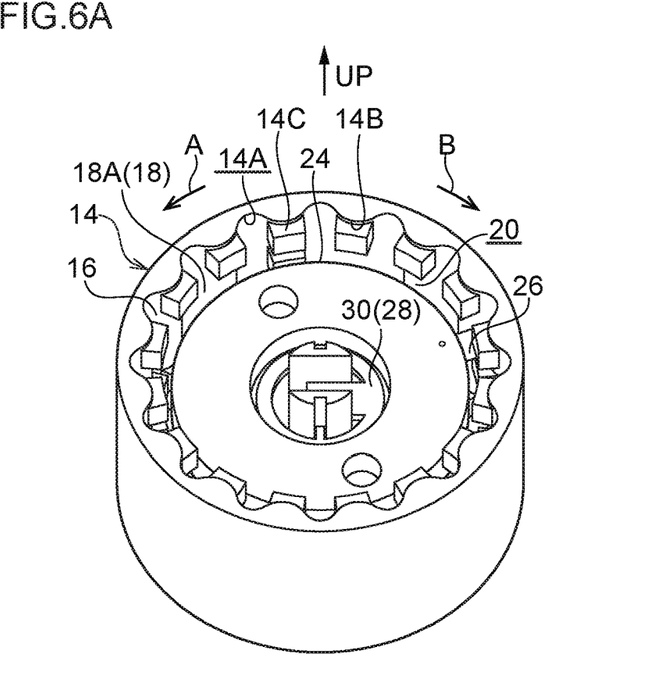
FIG. 6A is a perspective view showing when the shift position of the knob has been changed to the "D" position in the shift device pertaining to the embodiment of the invention.
Figure 6B:
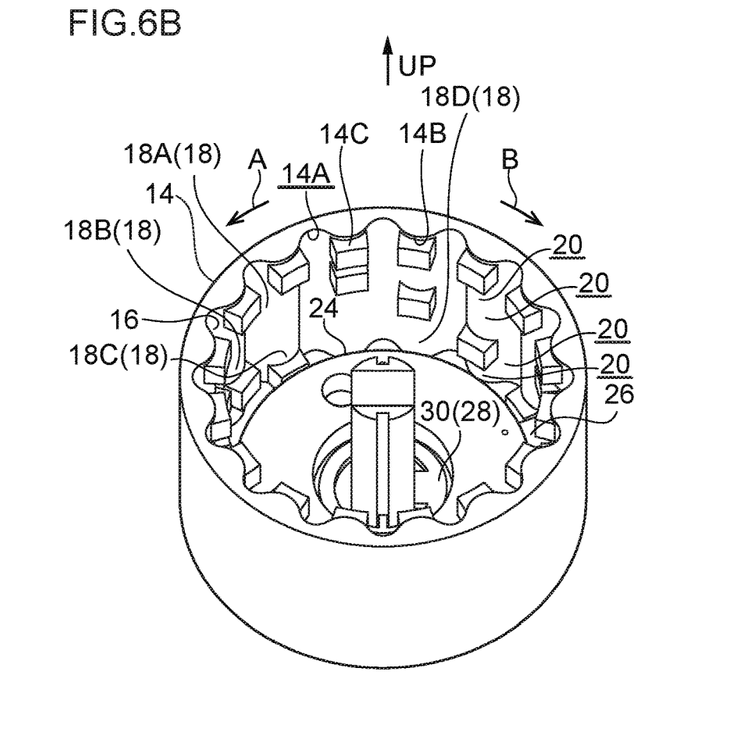
FIG. 6B is a perspective view showing when the shift position of the knob has been changed to the "P" position in the shift device pertaining to the embodiment of the invention.

When the knob 22 is rotatingly operated so that the carrier 24 is rotated, the detent pins 26 become engaged with the P recesses, the R recesses, the N recesses, and the D recesses that are the recess portions 14A of the rotation paths 20 because of biasing force, and the knob 22 becomes disposed in the "P" position, the "R" position, the "N" position, and the "D" position (see FIG. 5B, FIG. 6A, and FIG. 6B). When the knob 22 is rotatingly operated between shift positions, the carrier 24 is rotated and the detent pins 26 cross over the ridge portions 14B of the rotation paths 20, whereby a rotation-resisting force acts on the knob 22 because of the biasing force on the detent pins 26, thereafter a rotation-assisting force acts, and a moderate feel acts on the rotating operation of the knob 22.

In a case where the brake 44 is not operated when the knob 22 is disposed in the "P" position, the motor 34 is driven in the changing mechanism 28 by the control of the control device 38 so that the carrier 24 is displaced upward by the lifter gear 32 and the lifter 30, whereby the carrier 24 becomes disposed in the regulation stratum 16 of the inner peripheral surface of the engagement tube 14 and the detent pins 26 become engaged with the recess portions 14A of the regulation stratum 16 (see FIG. 5A). For this reason, rotation of the detent pins 26 in the other direction is regulated by the regulation projections 14C and rotation of the carrier 24 in the other direction is regulated, whereby rotation of the knob 22 in the other direction is regulated and changing of the shift position of the knob 22 from the "P" position is regulated (locked).

On the other hand, in a case where the brake 44 has been operated when the knob 22 is disposed in the "P" position, the motor 34 is driven in the changing mechanism 28 by the control of the control device 38 so that the carrier 24 is displaced downward by the lifter gear 32 and the lifter 30, whereby the carrier 24 becomes disposed in the rotation stratum 18 (any one of the first stratum 18A to the fourth stratum 18D) and the detent pins 26 become engaged with the P recesses of the rotation paths 20 (see FIG. 5B). For this reason, rotation of the detent pins 26 in the other direction is allowed and rotation of the carrier 24 in the other direction is allowed, whereby rotation of the knob 22 in the other direction is allowed and changing of the shift position of the knob 22 from the "P" position is allowed (unlocked).

In a case where the switch 46 has been operated for regulation when the knob 22 is disposed in the "N" position, the motor 34 is driven in the changing mechanism 28 by the control of the control device 38 so that the carrier 24 is displaced upward by the lifter gear 32 and the lifter 30, whereby the carrier 24 becomes disposed in the regulation stratum 16 and the detent pins 26 become engaged with the recess portions 14A of the regulation stratum 16. For this reason, rotation of the detent pins 26 in the one direction and the other direction is regulated by the regulation projections 14C and rotation of the carrier 24 in the one direction and the other direction is regulated, whereby rotation of the knob 22 in the one direction and the other direction is regulated and changing of the shift position of the knob 22 from the "N" position is regulated.

On the other hand, in a case where the switch 46 has been operated for cancellation when the knob 22 is disposed in the "N" position, the motor 34 is driven in the changing mechanism 28 by the control of the control device 38 so that the carrier 24 is displaced downward by the lifter gear 32 and the lifter 30, whereby the carrier 24 becomes disposed in the rotation stratum 18 (any one of the first stratum 18A to the fourth stratum 18D) and the detent pins 26 become engaged with the N recesses of the rotation paths 20. For this reason, rotation of the detent pins 26 in the one direction and the other direction is allowed and rotation of the carrier 24 in the one direction and the other direction is allowed, whereby rotation of the knob 22 in the one direction and the other direction is allowed and changing of the shift position of the knob 22 from the "N" position is allowed.

Furthermore, in a case where the engine 40 has been switched OFF (a predetermined occasion) when the knob 22 is disposed in a shift position (e.g., the "D" position) other than the "P" position (see FIG. 6A), the shift range of the automatic transmission 42 is automatically changed, by the control of the control device 38, from the shift range (e.g., the "D" range) other than the "P" range to the "P" range.

Figure 4A:
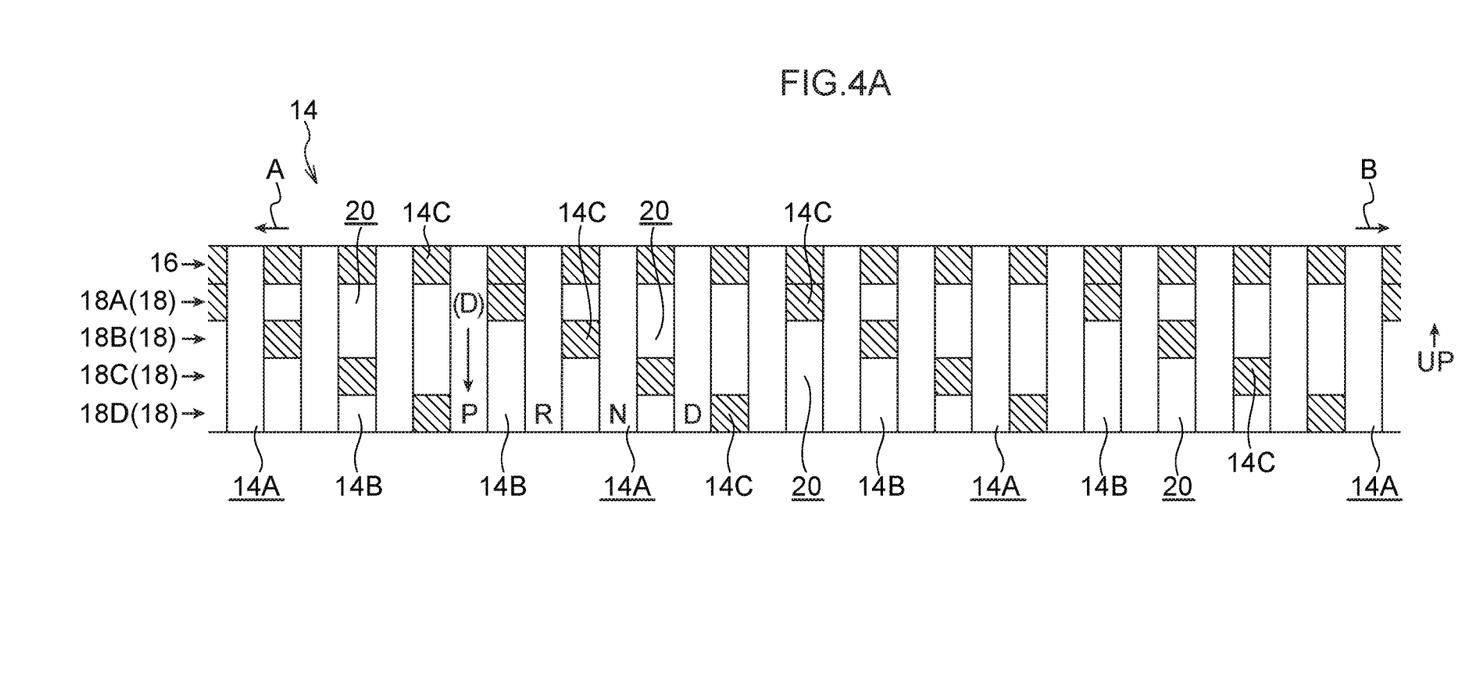
FIG. 4A is a developed view showing displacement of the detent pins at the inner peripheral surface of the engagement tube in a case where the shift position of the knob is changed from a "D" position to a "P" position in the shift device pertaining to the embodiment of the invention.
Figure 4B:
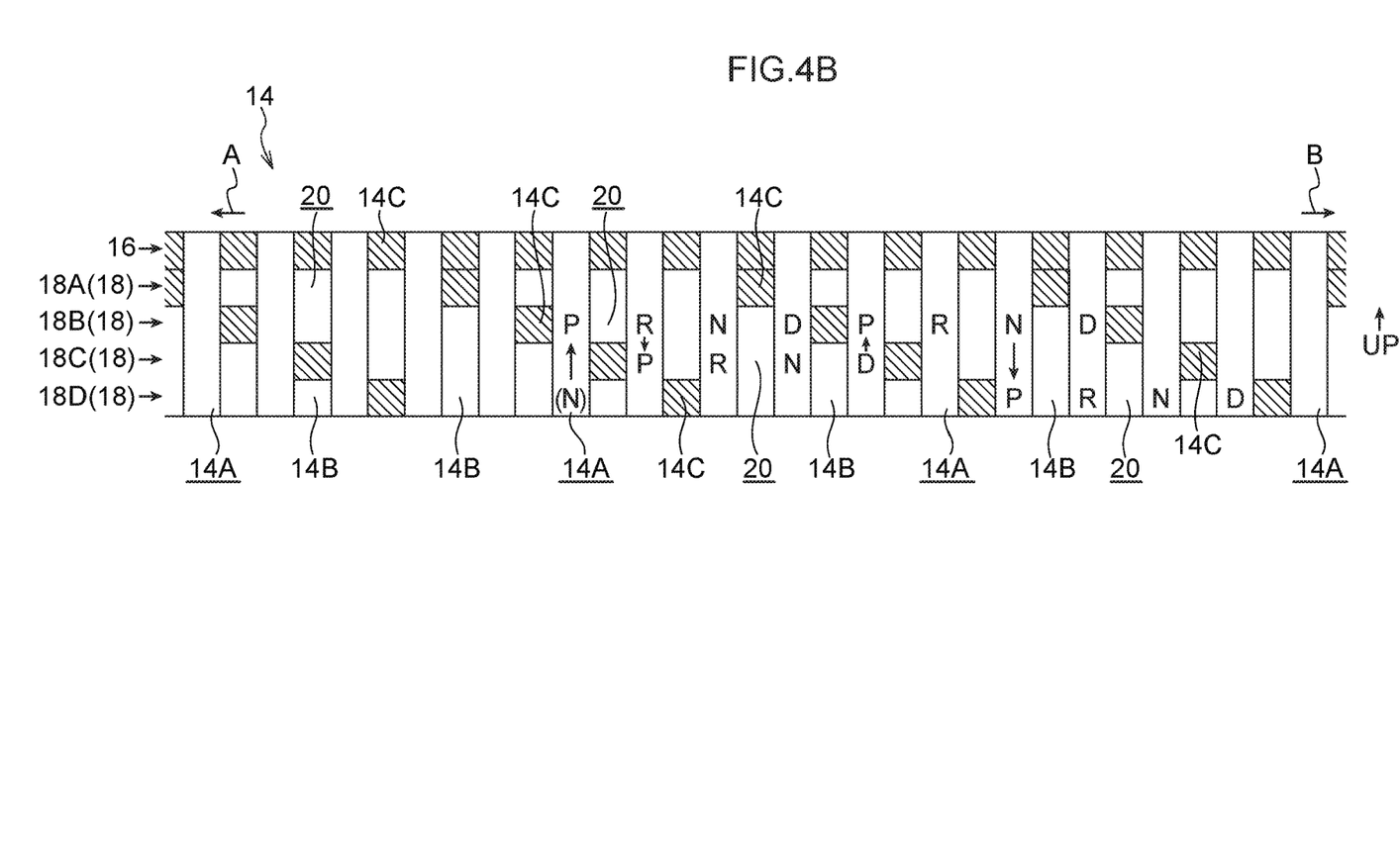
FIG. 4B is a developed view showing displacement of the detent pins at the inner peripheral surface of the engagement tube in a case where the shift position of the knob is changed from a shift position other than the "P" position to the "P" position in the shift device pertaining to the embodiment of the invention.

In a case where the engine 40 has been switched OFF when the knob 22 is disposed in a shift position other than the "P" position, the motor 34 is driven in the changing mechanism 28 by the control of the control device 38 so that the carrier 24 is displaced upward or downward by the lifter gear 32 and the lifter 30, whereby the rotation stratum 18 in which the carrier 24 is disposed becomes changed and the detent pins 26 become engaged with the P recesses of the rotation paths 20 (see FIG. 4A, FIG. 4B, and FIG. 6B). For this reason, the shift position of the knob 22 is changed from the shift position other than the "P" position to the "P" position and corresponded to the shift range of the automatic transmission 42.

Here, as described above, the changing mechanism 28 displaces the carrier 24 in the up and down direction, whereby the rotation stratum 18 in which the carrier 24 is disposed becomes changed and the rotation paths 20 with which the detent pins 26 of the carrier 24 are engaged becomes changed. For this reason, to change the rotation paths 20 with which the detent pins 26 are engaged, the changing mechanism 28 needs only to displace the carrier 24, and so the changing mechanism 28 can be given a configuration provided with one motor 34 (drive device) and the configuration of the changing mechanism 28 can be simplified.

Moreover, the changing mechanism 28 displaces the carrier 24 in the up and down direction to thereby change the rotation paths 20 with which the detent pins 26 are engaged, whereby the rotatable range of the knob 22 is changed and the shift position of the knob 22 is changed (returned) from a shift position other than the "P" position to the "P" position. For this reason, the rotatable range of the knob 22 can be changed and the shift position of the knob 22 can be changed from a shift position other than the "P" position to the "P" position. Moreover, the shift position of the knob 22 can be returned to the "P" position without having to rotate the knob 22 from the shift position other than the "P" position to the "P" position, and the shift position of the knob 22 can be kept from not being returned to the "P" position as a result of the rotation of the knob 22 being restricted by an external factor, for example.

Furthermore, the plural rotation strata 18 are lined up in the direction of the rotational axis of the knob 22 (the up and down direction, a direction perpendicular to the rotation) and the rotation paths 20 of the rotation strata 18 are lined up in the direction of the rotational axis of the knob 22. For this reason, the changing mechanism 28 can change the rotation paths 20 with which the detent pins 26 are engaged by displacing the carrier 24 in the direction of the rotational axis of the knob 22, and so the rotation paths 20 with which the detent pins 26 are engaged can be easily changed.

Moreover, the detent pins 26 are biased so that the carrier 24 is biased from the ridge portion 14B sides to the recess portion 14A sides of the rotation paths 20, whereby the knob 22 is biased toward its shift positions. For this reason, the detent pins 26 can be used to bias the knob 22 toward its shift positions, the need to use a member separate from the detent pins 26 to bias the knob 22 toward its shift positions can be eliminated, and the configuration of the shift device 10 can be simplified.

Furthermore, as described above, the changing mechanism 28 disposes the carrier 24 in the regulation stratum 16 so that the detent pins 26 become engaged with the recess portions 14A of the regulation stratum 16, whereby rotation of the detent pins 26 is regulated and rotation of the knob 22 is regulated. For this reason, the detent pins 26 can be used to regulate the rotation of the knob 22, the need to use a member separate from the detent pins 26 to regulate the rotation of the knob 22 can be eliminated, and the configuration of the shift device 10 can be simplified.

In the present embodiment, the shift device 10 is configured in such a way that when the knob 22 is disposed in the "P" position and the "N" position, the changing mechanism 28 disposes the carrier 24 in the regulation stratum 16 so that rotation of the knob 22 is regulated. However, the shift device 10 may also be configured in such a way that when the knob 22 is disposed in a shift position other than the "P" position and the "N" position, the changing mechanism 28 disposes the carrier 24 in the regulation stratum 16 so that rotation of the knob 22 is regulated.

Moreover, in the present embodiment, the shift device 10 may also be configured in such a way that when the engine 40 is switched OFF in a state in which the brake 44 is operated or in a state in which the brake 44 is not operated, the changing mechanism 28 disposes the carrier 24 in the regulation stratum 16 so that rotation of the knob 22 is regulated.

Furthermore, in the present embodiment, the changing mechanism 28 changes the rotation stratum 18 in which the carrier 24 is disposed, whereby the detent pins 26 become engaged with the P recesses that are the recess portions 14A and the shift position of the knob 22 is changed to the "P" position. However, the shift device 10 may also be configured so that when the changing mechanism 28 changes the rotation stratum 18 in which the carrier 24 is disposed, the detent pins 26 become engaged with recess portions 14A (e.g., the N recesses) other than the P recesses and the shift position of the knob 22 becomes changed to a shift position (e.g., the "N" position) other than the "P" position.

Moreover, in the present embodiment, the shift device 10 is configured in such a way that the rotation paths 20 are lined up in the direction of the rotational axis of the knob 22, so that the changing mechanism 28 displaces the detent pins 26 in the direction of the rotational axis of the knob 22 to thereby change the rotation paths 20 with which the detent pins 26 are engaged. However, the shift device 10 may also be configured in such a way that the rotation paths 20 are lined up in the radial direction of rotation of the knob 22, so that the changing mechanism 28 displaces the detent pins 26 in the radial direction of rotation of the knob 22 to thereby change the rotation paths 20 with which the detent pins 26 are engaged.

Furthermore, in the present embodiment, the engagement tube 14 is provided on the case 12 side and the detent pins 26 are provided on the knob 22 side. However, the detent pins 26 may also be provided on the case 12 side and the engagement tube 14 may also be provided on the knob 22 side.

Moreover, in the present embodiment, the shift device 10 is configured in such a way that the changing mechanism 28 displaces the detent pins 26 to thereby change the rotation paths 20 with which the detent pins 26 are engaged. However, the shift device 10 may also be configured in such a way that the changing mechanism 28 displaces the engagement tube 14 to thereby change the rotation paths 20 with which the detent pins 26 are engaged.

Furthermore, in the present embodiment, the knob 22 (shift member) is rotated. However, the shift member may also be pivoted or slid.

Moreover, in the present embodiment, the shift device 10 is installed in the console. However, the shift device 10 may also be installed in an instrument panel or a column cover.

What is claimed is:

1. A shift device comprising:
   a shift member whose shift position is changed as a result of being moved with respect to a vehicle body side;
   plural movement paths provided at one of the vehicle body side or a shift member side;
   a moving portion that is provided at the other of the vehicle body side or the shift member side and that is relatively movable with respect to the movement paths in a state in which the moving portion is disposed in one of the movement paths; and
   a changer that relatively displaces the moving portion by an electrical drive force, in an adjacent direction of the movement paths with respect to the one of the vehicle body side or the shift member side, from the one of the movement paths in which the moving portion is disposed to another of the movement paths, wherein the adjacent direction is different from a relative movement direction of the moving portion with respect to the movement paths and wherein the shift member cannot move beyond a movable range defined by the moving portion being disposed in the one of the movement paths, in the state in which the moving portion is disposed in the one of the movement paths,
   wherein the movable range of each of the plural movement paths includes plural shift positions.

2. The shift device according to claim 1, wherein the movable range of the shift member is changed as a result of the movement path in which the moving portion is disposed being changed.

3. The shift device according to claim 1, wherein the plural movement paths are lined up in a direction perpendicular to movement of the shift member.

4. The shift device according to claim 1, wherein the shift member is biased toward its shift position as a result of the moving portion being disposed in the movement path.

5. The shift device according to claim 1, further comprising a regulation portion that is provided at the one of the vehicle body side or the shift member side and by which movement of the shift member is regulated as a result of the moving portion being disposed in the regulation portion.

* * * * *